(12) United States Patent
Keegan

(10) Patent No.: US 6,773,845 B2
(45) Date of Patent: Aug. 10, 2004

(54) FLUID DISTRIBUTION SURFACE FOR SOLID OXIDE FUEL CELLS

(75) Inventor: Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 286 days.

(21) Appl. No.: 09/892,959

(22) Filed: Jun. 27, 2001

(65) Prior Publication Data

US 2003/0003344 A1 Jan. 2, 2003

(51) Int. Cl.$^7$ ................................................. H01M 8/04
(52) U.S. Cl. ............................. 429/39; 429/30; 429/34
(58) Field of Search ............................... 429/34, 30, 39

(56) References Cited

U.S. PATENT DOCUMENTS

| | | | |
|---|---|---|---|
| 5,604,048 A | 2/1997 | Nishihara | |
| 5,686,199 A | 11/1997 | Cavalca et al. | |
| 5,763,114 A | 6/1998 | Khandkar et al. | |
| 5,938,975 A | 8/1999 | Ennis et al. | |
| 6,001,501 A | 12/1999 | Collie | |
| 6,074,771 A | 6/2000 | Cubukcu et al. | |
| 6,230,494 B1 | 5/2001 | Botti et al. | |
| 6,251,308 B1 * | 6/2001 | Butler | 429/30 X |
| 6,423,896 B1 | 7/2002 | Keegan | |
| 6,461,754 B1 * | 10/2002 | Zeng | 429/34 X |
| 6,485,852 B1 | 11/2002 | Miller et al. | |
| 6,500,574 B2 | 12/2002 | Keegan | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,609,582 B1 | 8/2003 | Botti et al. | |
| 6,613,468 B2 | 9/2003 | Simpkins et al. | |
| 6,613,469 B2 | 9/2003 | Keegan | |
| 6,620,535 B2 | 9/2003 | Mukerjee et al. | |

FOREIGN PATENT DOCUMENTS

| | | |
|---|---|---|
| DE | 19835759 | 2/2000 |
| JP | 05003038 4 | 3/1975 |
| JP | 63236265 4 | 10/1988 |
| JP | 01279573 9 | 11/1989 |
| JP | 07153472 | 6/1995 |
| JP | 11297341 | 10/1999 |
| JP | 11297343 | 10/1999 |
| JP | 2000021424 | 1/2000 |
| JP | 2000323149 | 11/2000 |
| JP | 2001052724 | 2/2001 |
| WO | 9411912 | 5/1994 |
| WO | 0141239 | 6/2001 |

* cited by examiner

*Primary Examiner*—John S. Maples
(74) *Attorney, Agent, or Firm*—Paul L. Marshall

(57) ABSTRACT

An electrode fluid distributor includes a fluid passageway having a plurality of segment pairs each including an inlet segment in fluid communication with an inlet and an outlet segment in fluid communication with an outlet. The fluid passageway may have a length greater than the longest dimension of the distributor. Further, a plurality of fluid passageways may be provided, wherein at least one of the fluid passageways includes at least one turn. A baffle is disposed between adjacent inlet segments and outlet segments of the fluid passageway. Each inlet segment is in fluid communication with adjacent inlet segments and adjacent outlet segments, and each outlet segment is in fluid communication with adjacent outlet segments.

17 Claims, 8 Drawing Sheets

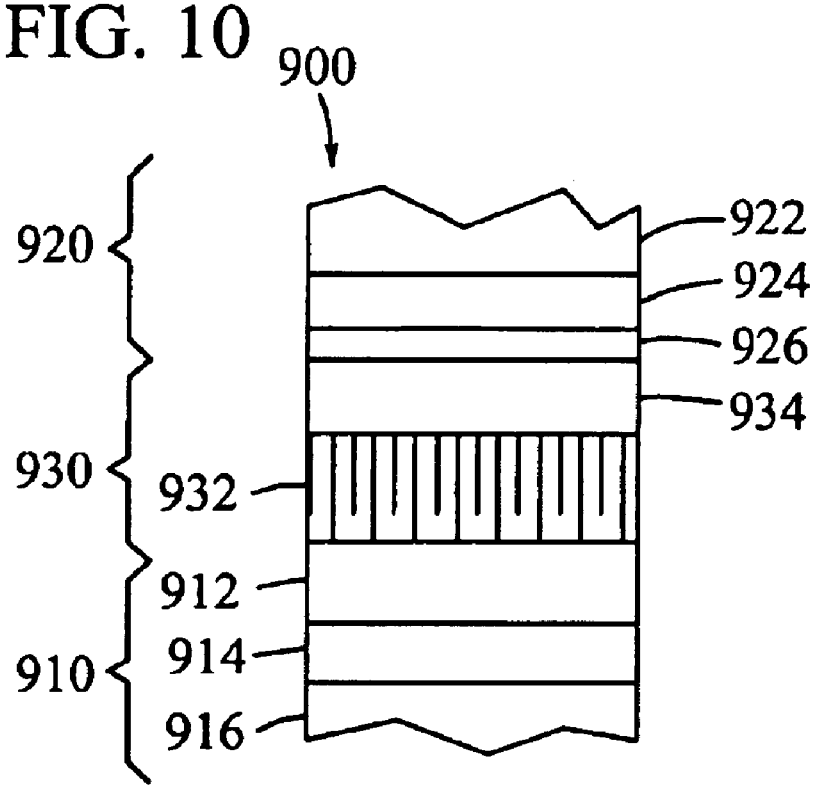
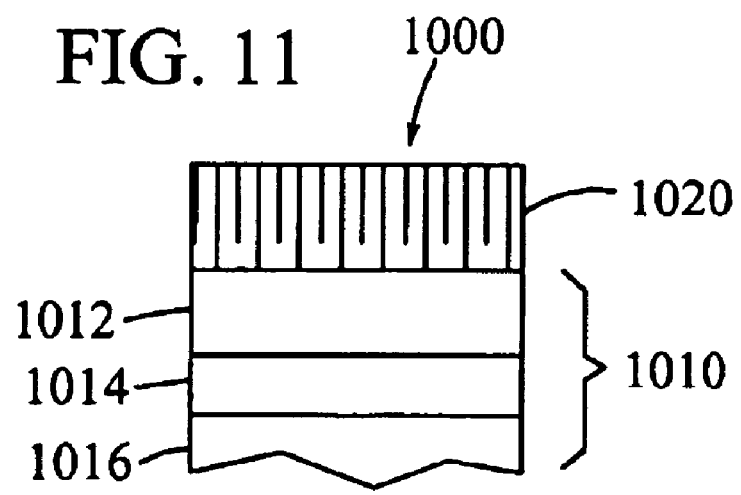

FLUID DISTRIBUTION SURFACE FOR SOLID OXIDE FUEL CELLS

BACKGROUND

Alternative transportation fuels have been represented as enablers to reduce toxic emissions in comparison to those generated by conventional fuels. At the same time, tighter emission standards and significant innovation in catalyst formulations and engine controls have led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, liquid petroleum gas, etc.) to significant toxic and $CO_2$ emission improvements (natural gas, dimethylether, etc.). Hydrogen is clearly the ultimate environmental fuel, with potential as a nearly emission free internal combustion engine fuel (including $CO_2$ if it comes from a non-fossil source). Unfortunately; the market-based economics of alternative fuels, or new power train systems, are uncertain in the short to mid-term.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, particularly solid oxide fuel cells ("SOFC"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat.

SOFC's are constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC cell stack also includes conduits or manifolds to allow passage of the fuel and oxidant into and byproducts, as well as excess fuel and oxidant, out of the stack. Generally, in certain cell configurations, oxidant is fed to the structure from a manifold located on one side of the stack, while fuel is provided from a manifold located on an adjacent side of the stack. The fuel and oxidant are generally pumped through the manifolds. From the manifolds, the fuel and oxidant are separately introduced to fluid distribution surfaces on an appropriate structure such as an interconnect between cells or an end cap. The fluid distribution surfaces are positioned in fluid communication with the appropriate electrode, with the SOFC efficiency related, in part, to fluid distribution across the surface of the electrode. Common fluid distributor surfaces, particularly for fuel electrode fluid distribution, include porous materials such as metal felts or foam metal having suitable void volume to allow passage of fluid from one or more inlet manifolds to one or more outlet manifolds.

Typically, fuel is introduced at the edge of the interconnect reacts with the electrode. In certain systems, for example where the fuel includes hydrogen and carbon monoxide, the anode reaction generally creates electrons and water. The continuing fuel stream thus further includes water. Consequently, certain regions of the electrode are prone to diminished fuel exposure, or starved. Furthermore, in certain conventional configurations such as those employing metal felt or foam metal, less than about 25% of the hydrogen in the inlet fuel stream is consumed by the fuel electrode. This detrimentally affects uniformity of temperature distribution across the electrode. These deficiencies lead to fuel waste and oxide formation, which detrimentally affects cell performance.

SUMMARY

Disclosed herein is an electrode fluid distributor. The distributor comprises a fluid passageway having a plurality of adjacent pairs of segments each including an inlet segment in fluid communication with an inlet and an outlet segment in fluid communication with an outlet. A baffle is disposed between adjacent inlet and outlet segments. Each inlet segment is in fluid communication with adjacent inlet segments and adjacent outlet segments, and each outlet segment is in fluid communication with adjacent outlet segments.

These and other features will be apparent from the following brief description of the drawings, detailed description, and attached drawings.

BRIEF DESCRIPTION OF THE DRAWINGS

Referring now to the figures, which are meant to be exemplary not limiting, and wherein like elements are numbered alike in the several figures:

FIG. 10 is a schematic of a SOFC system incorporating the fluid distribution system; and FIG. 11 is a schematic of another SOFC system incorporating the fluid distribution system.

DETAILED DESCRIPTION

Different types of SOFC systems exist, including tubular or planar systems. These various systems, while operating with different cell configurations, have similar functionality. Therefore, reference to a particular cell configuration and components for use within a particular cell configuration are intended to also represent similar components in other cell configurations, where applicable.

Generally, the system may comprise at least one SOFC, an engine, one or more heat exchangers, and optionally, one or more compressors, an exhaust turbine, a catalytic converter, preheating device, plasmatron, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components.

Figure 1:
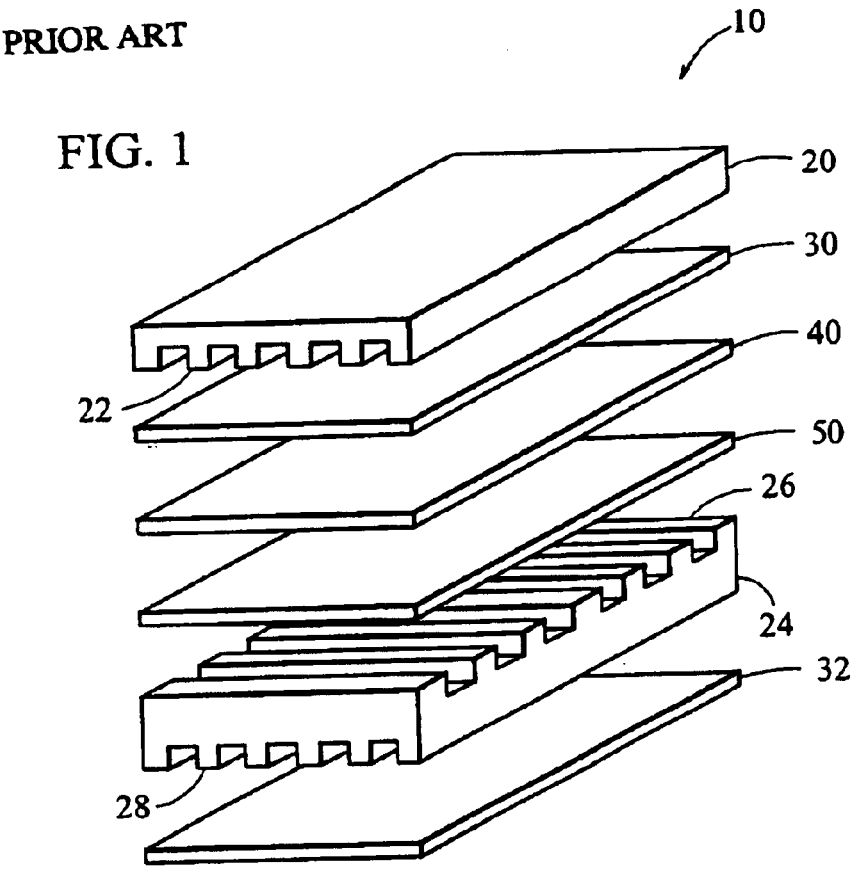
FIG. 1 is an expanded isometric view of a SOFC.

One configuration of a SOFC includes a stack of planar SOFC's. An electrochemical cell stack 10 is illustrated in FIG. 1. A fuel electrode or anode 30 and an oxygen electrode or cathode 50 are disposed on opposite sides of a solid electrolyte 40. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to an anode 32 of another SOFC. Anode 32 is disposed adjacent to interconnect 24 to illustrate the placement of and ability to stack several electrochemical cells connected to electrochemical cell 10.

The solid electrolyte 40 of the electrochemical cell 10 can be an ion conductor capable of transporting oxygen ions from the cathode 50 to the anode 30, that is compatible with the environment in which the SOFC will be utilized (e.g., temperatures of about −40° C. up to about 1,000° C.). Generally, solid electrolyte materials include conventional materials, such as ceramics and/or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+2}$ valence metal oxides).

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40% porous, typically preferred.

The composition of the anode 30 and cathode 50 can comprise elements such as zirconium, yttrium, nickel, manganese, strontium, lanthanum, iron, and cobalt, samarium, calcium, proseodynium, and, oxides, alloys, and combinations comprising at least one of the foregoing elements. Preferably, the anode material is formed upon a ceramic skeleton, such as nickel oxide-yttria-stabilized zirconia, and the like, for thermal compatibility.

Either or both the anode 30 and the cathode 50 can be formed on the electrolyte 40 by a variety of techniques including sputtering, chemical vapor deposition, screen printing, spraying, dipping, painting, and stenciling, among others. The electrodes are disposed typically about 10 to about 1,000 microns or so in thickness. In the anode supported case, the anode is preferably about 1,000 microns, the electrolyte about 10 microns, and the cathode about 40 microns.

The electrochemical cell 10 can be electrically connected with other electrochemical cells by using for example, interconnect 24. Depending upon the geometry of the SOFC, the fuel and the oxidant flow through the electrochemical cell 10 via the passageways of the end cap 20 and the interconnect 24. The end cap 20 and the interconnect 24 are generally formed of a material capable of withstanding the pressures and temperatures of the SOFC, and capable of conducting electricity. For example, suitable end caps and interconnects can be in the form of mats, fibers (chopped, woven, non-woven, long and the like) which are capable of withstanding automobile operating conditions (e.g., temperatures of about −40° C. to about 1,000° C.) and are electrically conductive material compatible with the oxidizing or reducing nature of the fuel cell environment. Some possible end caps and interconnects can comprise materials such as silver, copper, ferrous materials, strontium, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 10 comprising a single anode 30, a single electrolyte 40, and a single cathode 50, generates a relatively small voltage, generally from about 0.5 to about 1.1 volts. Higher voltages are attained by electrically connecting a plurality of electrochemical cells in series to form a stack. The total number of cells forming a stack can range from 2 to several hundred, depending on power requirements, space and weight restrictions, economics, and the like.

The dimensions of each cell may vary generally depending on the spacial requirements and the desired output. Generally, SOFC's may be employed in areas ranging from a microscopic scale, wherein each cell has an area of several microns squared, to an industrial power generation scale, such as in a power plant wherein each cell has an area of several meters squared. Particularly useful dimensions for SOFC's employed in automotive applications are about 50 to about 200 squared centimeters per cell (cm$^2$/cell), but it will be understood that these dimensions may vary depending on various design considerations.

Figure 2:
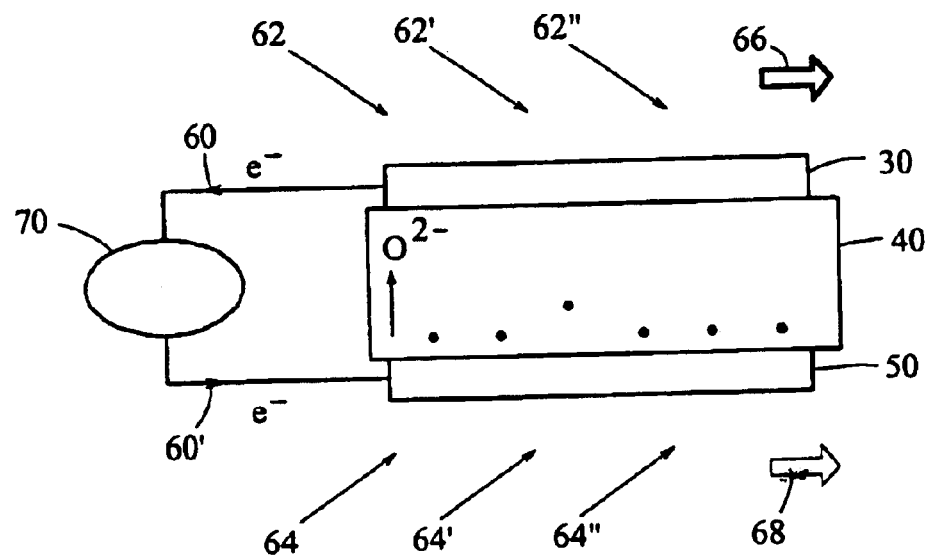
FIG. 2 is a schematic of the operation of a SOFC.

In operation, the electrochemical cell 10 produces a current flow as illustrated by current flow arrows 60, 60' in FIG. 2. Oxidant gases, such as oxygen or air, can be introduced to the cathode side of the cell, flowing as illustrated by the oxidant flow arrows 64, 64', 64". The oxidant receives the flowing electrons (e$^-$) and converts them into oxygen ions (O$^{2-}$), which diffuse through the electrolyte 40 to the anode 30, as depicted in the following reaction:

$$O_2 + 4e^- \rightarrow 2O^{2-}$$

At the anode, the oxygen ions react with a fuel, such as hydrogen, carbon monoxide, methane, other hydrocarbons, or a combination comprising at least one of the foregoing fuels, which is introduced to the electrochemical cell 10 as illustrated by the fuel flow arrows 62, 62', 62". The reaction of the fuel and oxygen ions produces electrons (e$^-$), which flow outside of the electrochemical cell 10 to the external circuit 70 and back to the cathode 50. The fuel/oxygen ion reaction is depicted in the following reactions:

$$H_2 + O^{2-} \rightarrow H_2O + 2e^-$$

(when fuel is hydrogen)

$$CO + O^{2-} \rightarrow CO_2 + 2e^- \text{ (when fuel is carbon monoxide)}$$

$$CH_4 + 4O^{2-} \rightarrow 2H_2O + CO_2 + 8e^- \text{ (when fuel is methane)}$$

Unreacted fuel and byproducts, such as water or carbon monoxide, exit the electrochemical cell 10 in the fuel stream, as illustrated by fuel stream arrow 66, while excess oxidant exits the electrochemical cell 10, as illustrated by oxidant stream arrow 68.

Basically, the electrolyte 40 conducts these oxygen ions (O$^{2-}$) between the anode 30 and the cathode 50, maintaining an overall electrical charge balance. The cycle of flowing electrons (e$^-$) from the anode 30 through the external circuit 70 to the cathode 50 creates electrical energy for harnessing. This electrical energy can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike electricity generated in conventional motor vehicles, the electricity produced by the SOFC is direct current, which can be matched to the normal system voltage of the vehicle. This minimizes or avoids the need for devices such as diodes, voltage conversion and other losses, such as resistive losses in the wiring and in/out of the battery, associated with conventional vehicle systems and traditional hybrid electrical systems. This high efficiency electricity allows electrification of the vehicle, including functions such as air conditioning and others, while allowing weight, fuel economy and performance advantages compared to conventional hybrid electric mechanization and conventional internal combustion engine systems.

During start-up and for cabin heating the SOFC can be operated at high adiabatic temperatures, e.g. up to about 1,000° C., subject to catalyst limitations, with typical operating temperatures ranging from about 600° C. to about 900° C., and preferably about 650° C. to about 800° C. Consequently, at least one heat exchanger is preferably employed to cool the SOFC effluent and conversely heat the air prior to entering the SOFC, with conventional heat exchangers generally employed.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropch, dimethyl ether, and others; and any combinations comprising at least one of the foregoing fuels. The preferred fuel is typically based upon the type of engine employed, with lighter fuels, i.e. those which can be more readily vaporized and/or conventional fuels which are readily available to consumers, generally preferred.

Furthermore, the fuel for the SOFC can be processed in a reformer. A reformer generally converts one type of fuel to a fuel usable by the SOFC (e.g., hydrogen). Mainly two types of reformer technologies are employed, steam reformers which employ an exothermic reaction and partial oxidation reformers which employ an endothermic reaction. Steam reformer technology is generally employed for converting methanol to hydrogen. Partial oxidation reformers are generally employed for converting gasoline to hydrogen. Typical considerations for the reformers include rapid start, dynamic response time, fuel conversion efficiency, size, and weight.

The SOFC may be used in conjunction with an engine, for example, to produce tractive power for a vehicle. Within the engine, SOFC effluent, air, and/or fuel are burned to produce energy, while the remainder of unburned fuel and reformed fuel is used as fuel in the SOFC. The engine can be any conventional combustion engine including, but not limited to, internal combustion engines such as spark ignited and compression ignited engines, including, but not limited to, variable compression engines.

Similar to the engine, the turbine can be employed to recover energy to produce tractive power and further to recover energy to operate the compressor(s) and preferably to generate electricity for various uses throughout the system and/or vehicle. The turbine employed can be any conventional turbine useful in automotive or power generation applications. In a preferred embodiment, the turbine and/or compressor may be accelerated or decelerated by a motor/generator to increase the compression (when required to increase the compression for optimal system performance) or to decrease compression (when excessive energy is available in the exhaust gases). For example, a high-speed electrical machine can be linked to the turbine and compressor.

After passing through the turbine, the SOFC effluent preferably enters a catalytic converter in order to attain extremely low, nearly zero emissions of hydrocarbons and nitric oxide. The catalytic converter is typical of those used in automotive applications, including those employing (1) noble metals and alloys thereof, such as platinum, rhodium and palladium catalysts and alloys thereof, among others and/or (2) particulate filtering and destruction.

Optional equipment which additionally may be employed with the present system includes, but is not limited to, sensors and actuators, heat exchangers, a battery, a fuel reformer, a burner, phase change material, a thermal storage system, a plasmatron, a desulfurizer, or any combination comprising at least one of the foregoing equipment. Desulfurizer equipment may also be employed, for example, if the fuel is rich in sulfur, or if the catalyst employed in the SOFC is particularly intolerant to sulfur, such as nickel-based catalysts.

An electrode fluid distributor, which may be a portion of an end structure or an interconnect, for example (or a surface thereof in the instance of a planar cell system), is provided herein. The distributor is configured to minimize starved areas of the fuel electrode, preferably by providing a substantially uniform fuel flow to the electrode. Oxide formation at the starved areas of the fuel electrode may be formed due to an excessive oxygen partial pressure at the local regions of the fuel electrode (i.e., the partial pressure of the oxygen ions diffused through the electrolyte from the cathode to the anode). During cell operation, the oxygen partial pressure is countered by the fuel, particularly the hydrogen, that reacts with the oxygen ions. Oxide formation is also partially due to the temperature at the electrode, wherein increased temperature may lead to increased oxide formation. Therefore, at hydrogen starved areas of the electrode, which are preferably minimized with the instant electrode fluid distributor, the oxygen ions may react with the material of the electrode rather than the hydrogen, thus oxide formation is increased. Preferably, in a cell using nickel electrode, the oxygen partial pressure is less than or equal to about $10^{-14}$ atmospheres to prevent oxide formation.

Additionally, the temperature gradient across the electrode is preferably minimized by the instant electrode fluid distributor. In areas of higher fuel consumption, higher power is produced, resulting in generation of higher temperatures. This is partially countered by heat removal, which is higher at regions of higher fluid flow.

Further, the electrode fluid distributor is configured to maximize fuel utilization in the cell as compared to SOFC's not employing the instant electrode fluid distributor. For example, in a low current output cell (e.g., about a 12 ampere load) only about 25% of the hydrogen in the fuel inlet stream is converted to water in SOFC's not employing the instant electrode fluid distributor. Therefore, preferably the instant electrode fluid distributor allows greater than about 25% hydrogen conversion at about a 12 ampere load, with greater than about 30% hydrogen conversion at about a 12 ampere load more preferred, greater than about 50% hydrogen conversion at about a 12 ampere load even more preferred, and greater than about 70% hydrogen conversion at about a 12 ampere load especially preferred.

Turning now to the structural details, which are intended to be exemplary and not limiting, the instant electrode fluid distributor generally comprises at least one fluid passageway having a plurality of adjacent segment pairs for placement proximate to an electrode of a fuel cell. Each segment pair includes an inlet segment and an adjacent outlet segment. The inlet segments are in fluid communication with an inlet of the electrode fluid distributor, and the outlet segments are in fluid communication with an outlet of the electrode fluid distributor. A baffle is disposed between adjacent inlet and outlet segments. Each inlet segment is in fluid communication with adjacent inlet segments and adjacent outlet segments. Furthermore, each outlet segment is in fluid communication with adjacent outlet segments.

In certain embodiments, the fluid passageway can be configured with a length greater than the longest dimension of the distributor. To provide this length, the fluid passageway may be a channel having a single turn or multiple turns. For example, if the electrode surface to have fluid distributed thereon is substantially long and narrow, a single or dual turn in the passageway may be suitable, whereas an electrode surface that is broader may have a plurality of turns.

Figure 8:
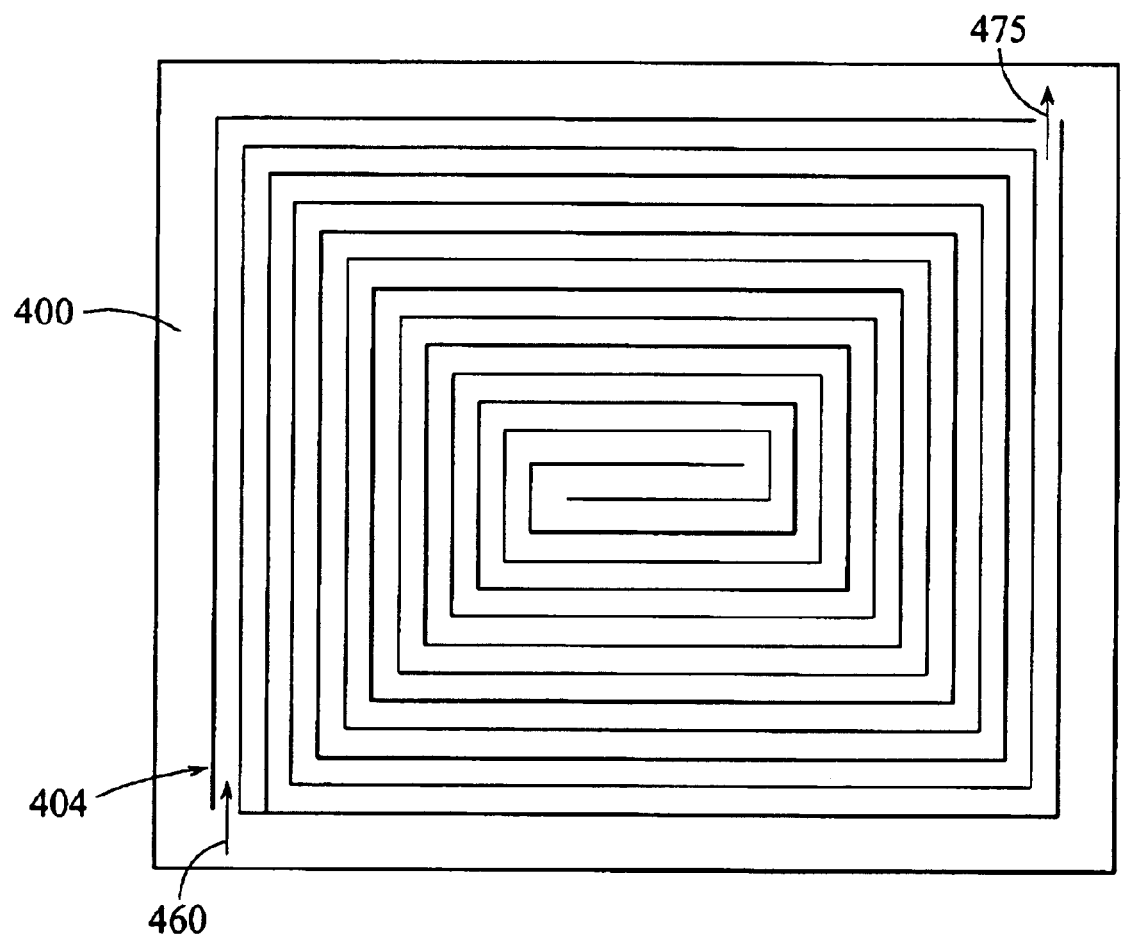
FIG. 8 is a partial plan view of yet another embodiment of a fluid distribution system.
Figure 9:
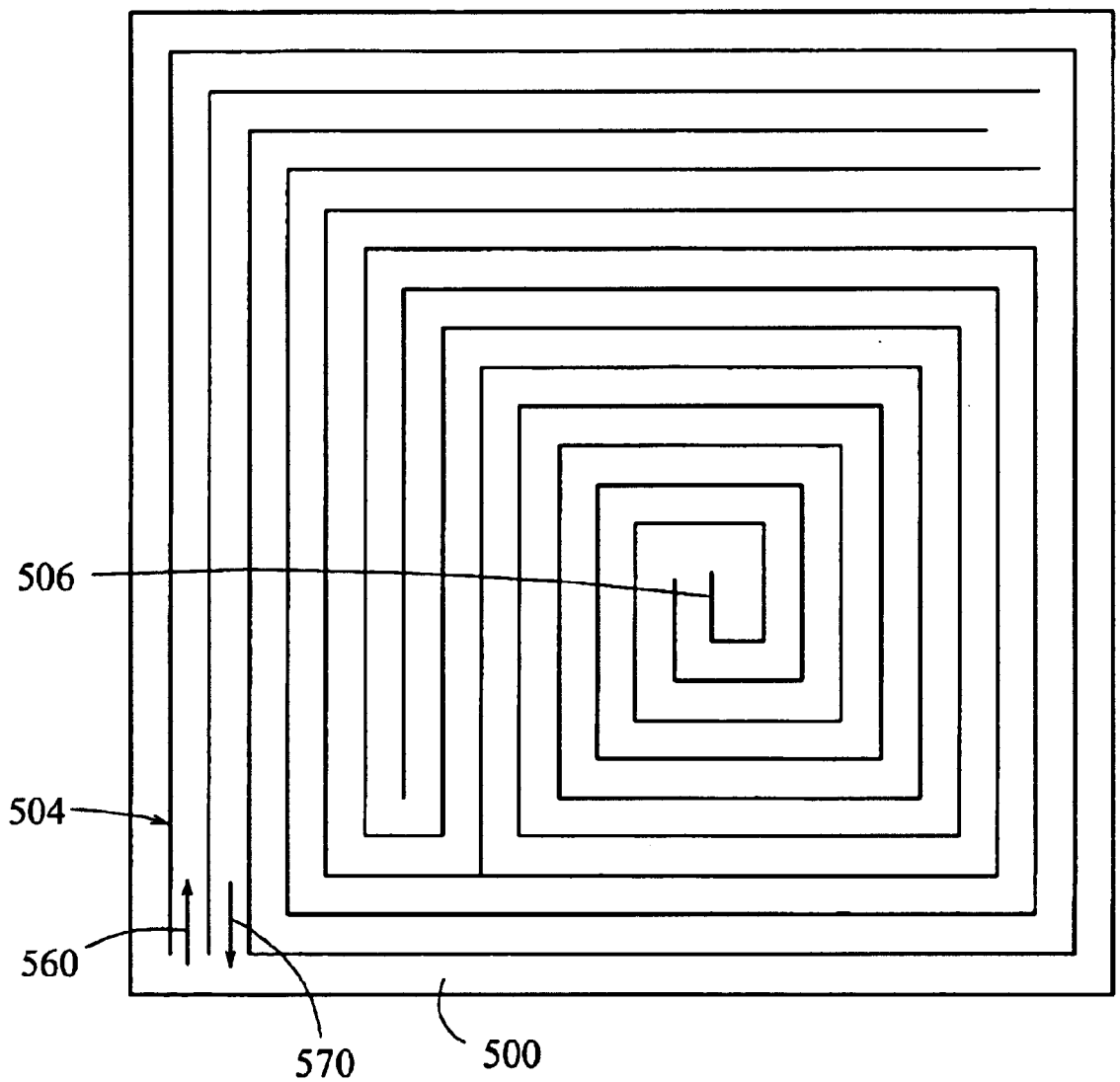
FIG. 9 is a partial plan view of another embodiment of a fluid distribution system.

The turn or turns of the channel may also vary, including, but not limited to, a continuous curved bend, a non-continuous curved bend, a discreet bend such as less than about 1° (but greater than 0°) to about 180°, or any combination comprising at least one of the foregoing turns. In a planar cell wherein the electrodes are substantially circular, a suitable fluid passageway configuration on an electrode fluid distributor's surface is, e.g., a spiral, wherein the curvature (i.e., the turn) of the channel may be substantially continuous. In another planar cell wherein the electrodes are substantially square, a suitable fluid passageway configuration on an electrode fluid distributor's surface is, e.g., comprises a channel having a plurality of turns. One example is a labyrinth, which may generally wind from an outer corner to a central point such as generally depicted in FIGS. 3 and 8 (described in greater detail herein), or have alternative turns such as generally depicted in FIG. 9 (also described in greater detail herein).

Figure 7:
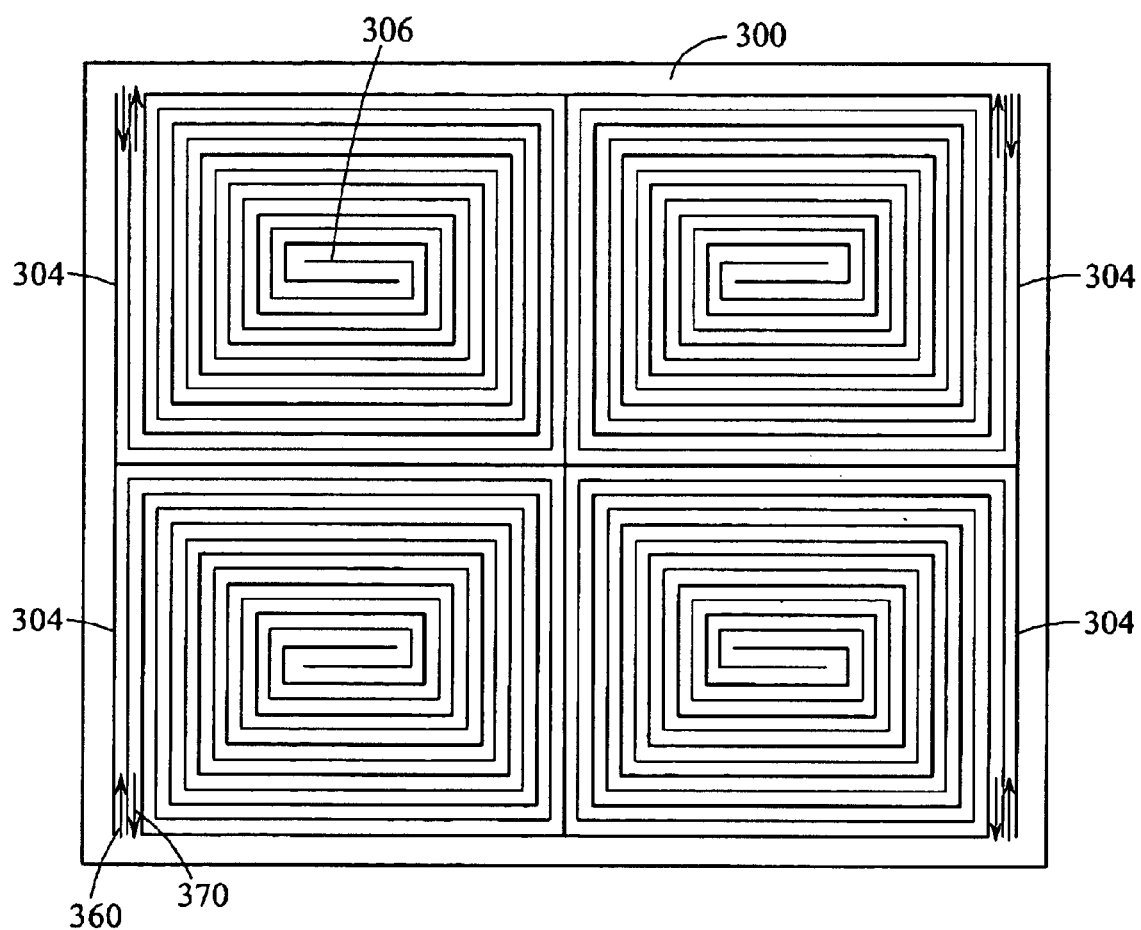
FIG. 7 is a partial plan view of another embodiment of a fluid distribution system.

In certain alternative embodiments, more than one fluid passageway is provided on the electrode fluid distributor. Consequently, the length of one or more of the fluid passageways may be equal to or less than the longest dimension of the distributor. One or more of the fluid passageways may be a channel having a single turn or multiple turns. One example of an electrode fluid distributor having more than one fluid passageway is generally depicted in FIG. 7 (described in greater detail herein).

It should be understood that the configuration (including but not limited to the number of turns and the types of turns) of the fluid passageway channel may vary based upon the configuration of the electrode fluid distributor, among other things.

Figure 3:
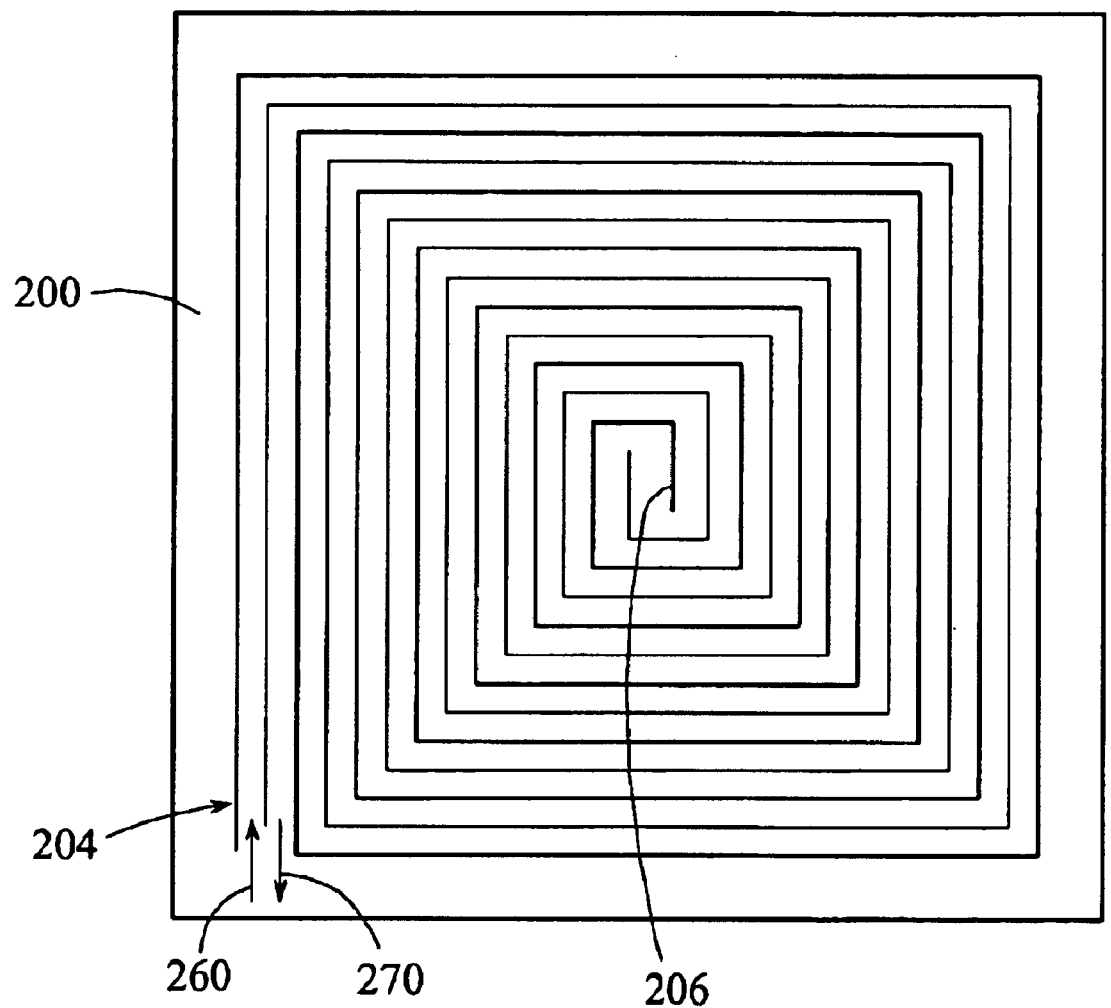
FIG. 3 is a partial plan view of one embodiment of a fluid distribution system.

Referring now to FIG. 3, a top plan view of a fluid distribution surface 200 of an electrode fluid distributor, for example, suitable for use as a portion of the end cap 20 or interconnect 24 described above. Surface 200 comprises an embodiment of the fluid passageway 204 that has an inlet and an outlet at a first corner of the surface 200. The fluid passageway 204 extends to an adjacent second corner of the surface 200, and turns about 90°, wherein the fluid passageway 204 further extends to an adjacent third corner, and turns about 90°, wherein the fluid passageway 204 extends to an adjacent fourth corner, which is also adjacent to the first corner. The fluid passageway 204 extends to the portion of the fluid passageway 204 proximate the first corner, turns about 90°, and extends to the portion of the fluid passageway 204 the second corner. The fluid passageway 204 continues generally in this manner until a central point 206 of the surface is reached. Alternatively, the point 206 may be a region of various shapes, such as circular, oval, square, rectangular, triangular, polygonal, or other shape.

Figure 4:
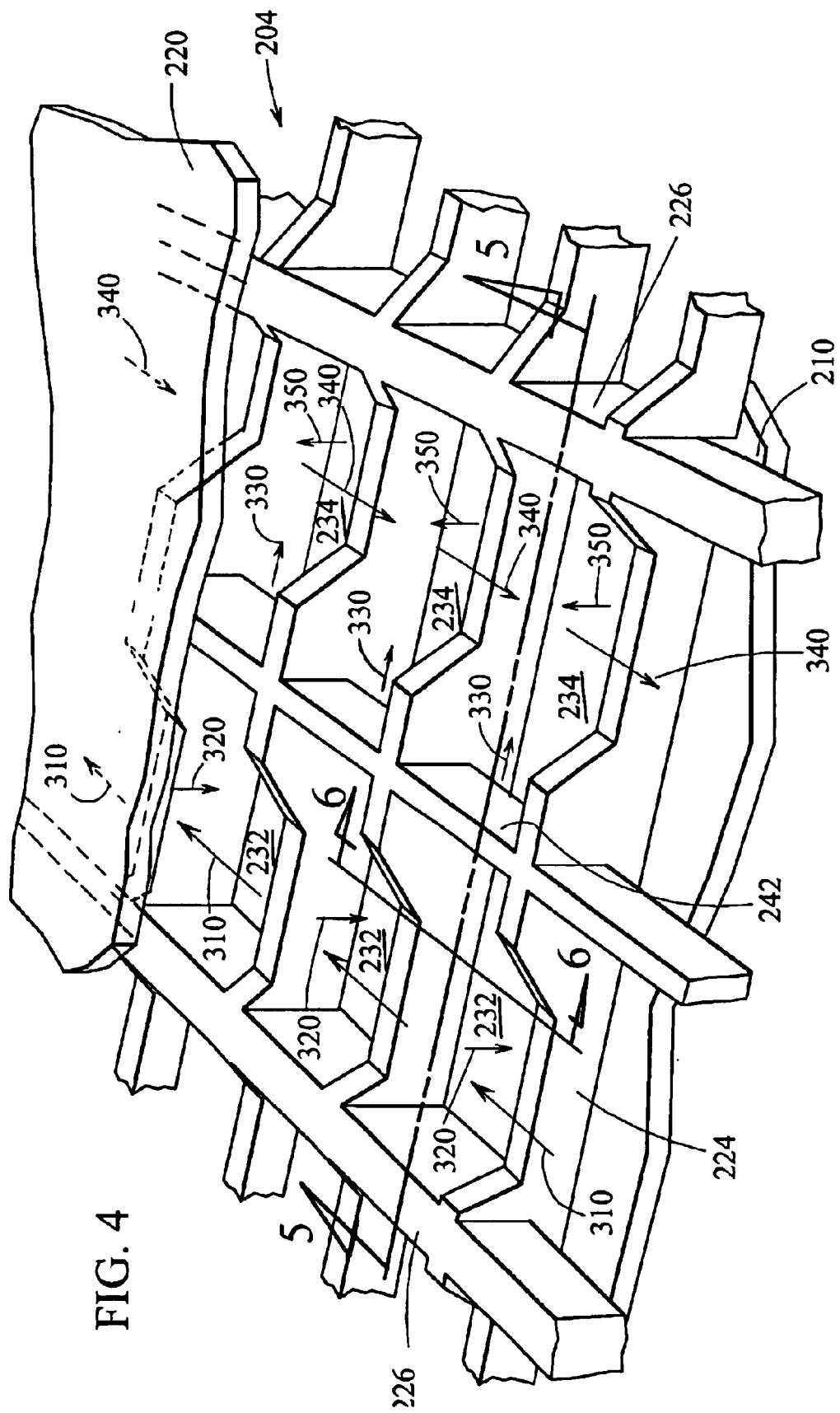
FIG. 4 is a partial isometric view of a fluid passageway employed within the fluid distribution system of FIG. 3.
Figure 5:
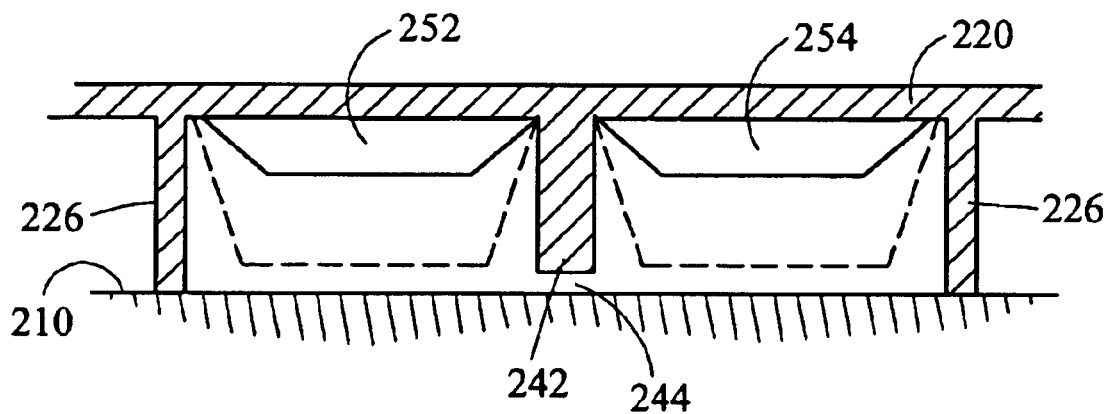
FIG. 5 is a sectional view along lines 5—5 of FIG. 4.
Figure 6:
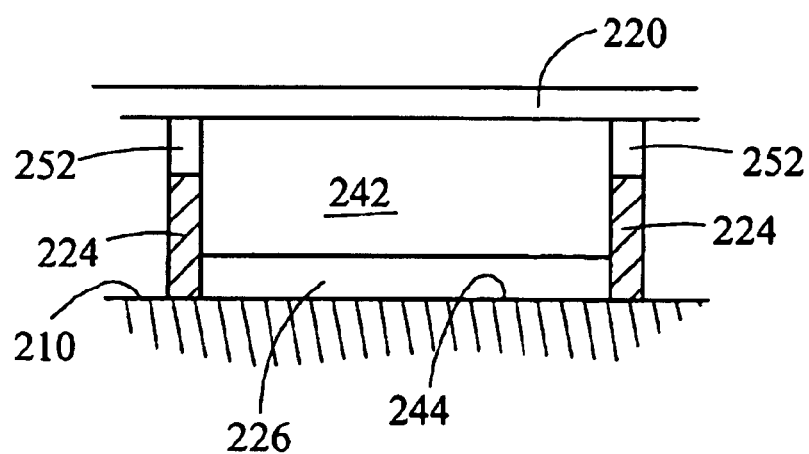
FIG. 6 is a sectional view along lines 6—6 of FIG. 4.

Referring still to FIG. 3, and also to FIGS. 4–6, a portion of the fluid passageway 204 is in fluid communication and electrical contact with an electrode 210. The fluid passageway 204 generally comprises an inlet channel and an outlet channel. The inlet channel, which in operation has a feed flow in a direction indicated by arrow 260, comprises a plurality of inlet segments 232, and the outlet channel, which in operation has an exit flow in a direction indicated by arrow 270, comprises a plurality of outlet segments 234. A plurality of adjacent segments pairs each having an inlet segment 232 and an adjacent outlet segment 234 form the fluid passageway 204 configured generally described above. Alternatively, the fluid passageway may have different configurations, including various numbers, types, and directions of turns.

The segment pairs are partially divided by a plurality of walls 224, and are separated from adjacent portions of the fluid passageway 204 by one or more sidewalls 226. Each of the segments 232, 234 is in fluid communication with a portion of the electrode 210 (wherein each portion is hereinafter referred to as the "segmental electrode portion").

In one embodiment, the widths of segments 232, 234 remain substantially the same in the along the direction of the fluid passageway 204 from the outer edge of surface 200 toward the point 206, thus the corresponding width of each of the segmental electrode portions remains substantially the same. Further, the length of the segments 232, 234 (i.e., between sequential walls 226) may remain substantially the same, wherein the areas of the segmental electrode portions remains substantially the same. In an alternative embodiment (not shown), the width and/or length of segments 232, 234 varies along the direction of the fluid passageway 204 from the outer edge of surface 200 toward the point 206, thus the corresponding area of each of the segmental electrode portions accordingly varies.

To segregate the surface 200 (FIG. 3) comprising fluid passageways 204 from the opposite surface, a separator 220 is formed. Separator 220 can be an end portion of an end cap or a dividing portion between two sides of an interconnect. The walls 224 and the sidewalls 226 generally extend from the separator 220 such that at least a portion of each wall 224 and at least a portion of each sidewall 226 abut the electrode 210. Those portions that abut the electrode 210 provide both electrical contact and fluid segregation between segments and between adjacent portions of the fluid passageway 204. Generally, sufficient electrical contact is provided for the respective size, load demands, operating conditions, and the like. Typically an electrical contact area of at least about 5%, with at least about 10% preferred, and about 10% to about 25% especially preferred, based upon the area of anode 210. The electrical contact is generally via the edges of walls 224, 226.

Each pair of segments comprising an inlet segment 232 and an outlet segment 234 are separated by a baffle 242. Fluid communication between the inlet segment 232 and the outlet segment 234 is at least partially hindered by the baffle 242. In one embodiment, the baffle 242 is positioned between a pair of walls 224 such that an opening 244 is created between the baffle 242 and the electrode 210. Alternatively, openings may be provided within the baffle 242. Further, one or more alternative openings may be combined with the opening 244. Such alternative openings may comprise holes, slots, apertures, pores, or other discreet openings, which enable sufficient fluid communication between the segments 232 and 234. Any of these alternatives may provide certain turbulence between segments 232 and 234 (cross turbulence) during operation, resulting in vortices. These may be desirable for improved mixing of the fuel and exhaust products.

For fluid communication along the direction of the fluid passageway 204 from the outer edge of surface 200 toward the point 206, each wall 224 comprises a first opening 252 and a second opening 254. A plurality of first openings 252 form an inlet channel through a plurality of corresponding inlet segments 232, and a plurality of second openings 254 form an outlet channel through a plurality of corresponding outlet segments 234. The inlet channel is in fluid communication with a feed fuel manifold, and the outlet channel is in fluid communication with a spent fuel manifold. To generate the driving force, the pressure in the feed fuel manifold is maintained at a higher level than the pressure in the spent fuel manifold. The pressure differential may be based on the inherent pressure drop through the passage, or it optionally may be adjusted based on target flow, varying cross-section of the opening, or the like.

Openings 252, 254 may be formed as cut away portions having a top generally bound by separator 220, as shown. Alternatively, openings may be provided elsewhere on the wall 224. Further, one or more alternative openings comprising holes, slots, or other openings, may be combined with the openings 252, 254. Still further, openings 254 and openings 252 may be configured and dimensioned differently or identical to one another, as well as the same as or different from each other opening 254, 252, respectively. Possible opening geometries range from multi-sided, e.g., semi-rectangular, semi-hexagonal, or other semi-polygonal shape, to smooth, e.g., semi-circle, semi-elliptical, and the like.

Further alternative configurations may also provide for some fluid communication between adjacent portions of the fluid passageway 204. This may be provided for by forming all or part of the walls 226 with a porous material, or by forming openings on the walls 226. Any of these alternatives may provide certain turbulence between proximate portions of the fluid passageway 204 during operation, resulting in vortices. However, in order to attain the desired fluid distribution across the electrode, the amount of fluid communication allowable between portions of the fluid passageway 204 is preferably minimal as compared to the fluid flow along the direction of the fluid passageway 204 from the outer edge of surface 200 toward the point 206.

The surface 200 including the fluid passageway 204 may be formed by various techniques, including but not limited to, machining, casting, molding, milling, chemical etching, and the like, as well as any combination comprising at least one of the foregoing techniques.

Due to the fluid passageway 204 configuration, each area of the electrode corresponding with each of the segments pairs 232 and 234 are exposed to substantially fresh fuel. Essentially, the surface 200 is positioned adjacent to a fuel electrode, and a feed fuel is introduced into the inlet channel generally via the feed fuel manifold. The feed fuel passes through the plurality of the first openings 252 along the direction of the fluid passageway 204 from the outer edge of surface 200 toward the point 206, generally indicated by arrows 310. As the feed fuel flows through each of the inlet segments 232, fresh fuel flows toward the segmental electrode portion proximate to the associated inlet segment 232 in a direction generally indicated by the arrows 320. Additionally, fresh fuel along with spent fuel from the electrode portion proximate to segment 232 flows through the opening 244 to the outlet segment 234 in a direction generally indicated by the arrows 330. Therefore, fluid is substantially overtly directed to electrode portions defined by the pairs of segments 232, 234 (as opposed to the fluid bleeding or flowing across an electrode wherein spent fuel and fresh fuel combined are directed into the individual segments).

At each inlet segment electrode portion, the fuel generally reacts to form water and electrons that energize the external circuit as described generally above with respect to FIG. 2. The resultant water and any unreacted fuel (hereinafter the spent fluid) flow from the inlet segment 232 through the opening 244 to the outlet segment 234 in a direction generally indicated by the arrows 330. The spent fluid from the outlet segments 234 exit via the second openings 254 in a direction generally indicated by arrows 340, and exit the fluid passageway 204 in a direction generally indicated by arrows 350.

Preferably, the segment pairs, the first openings 252, and/or the openings 244 are configured and dimensioned to allow all electrode regions corresponding with the segment pairs to be exposed to the same quantity and concentration of fuel. In fluid passageway 204, this may be accomplished by varying the area dimension of the opening from large to small along the direction of the fluid passageway 204 from the outer edge of surface 200 toward the point 206. Although the segmental electrode areas and the widths of the segments 232, 234 may generally remain the same along the direction of the fluid passageway 204 from the outer edge of surface 200 toward the point 206, to achieve approximately the same flow rate of the same concentration fuel is achieved per area unit of the cell the height and/or width of the openings 252, 254 may vary along the direction of the fluid passageway 204 from the outer edge of surface 200 toward the point 206 (as indicated in FIG. 5 by phantom lines). In certain configurations, for example, where the fluid passageway 204 is of a total length such that a greater variation in opening dimension is required, the thickness of the structure having surface 200 (i.e., the interconnect or end cap) is minimized by varying the width of the openings or both the width of the openings 252, 254 and the height of the openings 252, 254.

For example, a suitable fluid passageway 204 for use on an interconnect in a SOFC for automotive applications (e.g., about 50 to about 200 $cm^2$/cell) may have the following dimensions: a width between walls 226 of about 0.1 millimeters ("mm") to about 50 mm, preferably about 1 mm to about 20 mm, and more preferably about 8 mm to about 12 mm; a height of wall 226 of about 0.1 mm to about 5 mm, preferably about 0.1 mm to about 1 mm, and more preferably about 0.3 mm to about 0.7 mm; and openings 244 of about 0.05 mm to about 0.5 mm, preferably about 0.05 mm to about 0.2 mm, and more preferably about 0.08 mm to about 0.12 mm.

Although reference is made herein to a single fluid passageway 204, it is contemplated that one or more fluid passageways 204 can be employed as a portion of a fluid distribution system comprising fluid distribution systems other than the fluid passageway 204. Alternatively, a plurality fluid passageway 204 may comprise a portion of a fluid distribution system.

A possible alternative configuration for the fluid passageway is provided in FIG. 7. FIG. 7 shows a partial top view of a surface 300 comprising a plurality of fluid passageways 304, which are preferably each similar in detail to fluid passageways 204. Generally, fluid flows from a manifold or conduit assembly (not shown) into a plurality of inlets in the directions indicated by arrows 360. The fluid passes across an electrode via the plurality of fluid passageways 304, which are separate multiple turn passageways converging to separate points 306. The outlet fluid may exit on the same side as the inlet fluid in a direction indicated by arrow 370, typically with suitable manifolds and a suitable pressure difference between the inlet conduit and the outlet conduit.

Another alternative configuration is provided in FIG. 8, wherein a partial top view of a surface 400 comprising a fluid passageways 404 is shown, which are preferably each similar in detail to fluid passageways 204. However, fluid flows in at an inlet generally in the direction indicated by arrow 460, and spent fluid exits at an outlet generally in the direction indicated by arrow 475. Note that the position of the inlet segments and outlet segments are reversed, generally as compared to the positioning in FIG. 4. This alternative may be combined with other fluid passageway configurations, including but not limited to those described generally above, the configuration described with respect to FIG. 7, above, and the configuration described with respect to FIG. 9, below.

Yet another alternative configuration is provided in FIG. 9, wherein a partial top view of a surface 500 comprising a fluid passageways 504 is shown, which are preferably each similar in detail to fluid passageways 204. Fluid flows in at an inlet generally in the direction indicated by arrow 560, and spent fluid exits at an outlet generally in the direction indicated by arrow 570. The fluid passageway 504 extends to an adjacent second corner of the surface 500 (vertically upward as oriented in FIG. 9), and turns about 90° (toward the right as oriented in the figure), wherein the fluid passageway 504 further extends to an adjacent third corner. At the third corner, the fluid passageway 504 turns about 180°, wherein the fluid passageway 504 extends in the direction toward the second corner (toward the left as oriented in the Figure). The fluid passageway 504 then turns about 90°, wherein the fluid passageway 504 extends in the direction toward the first corner (vertically downward as oriented in the Figure), and further turns about 90°, wherein the fluid passageway 504 extends proximate to a fourth corner (toward the right as oriented in the Figure). The fluid passageway 504 then turns about 90°, wherein the fluid passageway 504 extends in the direction toward the third corner (vertically upward as oriented in the Figure), and further turns about 90°, wherein the fluid passageway 504 extends in the direction toward the second corner (toward the left as oriented in the Figure), and still further turns about 90°, wherein the fluid passageway 504 extends in the direction toward the first corner (vertically downward as oriented in the Figure). The fluid passageway at this point turns about 180°, wherein the fluid passageway 504 extends in the direction toward the second corner (vertically upward as oriented in the Figure), and further continues turning 90° until a central point 506 of the surface is reached.

Referring now to FIG. 10, an interconnect 930 is provided. A portion 932 comprises a surface for an electrode distributor, for example similar to surface 200, 300, 400, 500, or any combination comprising at least one of these surfaces. Portion 932 is at least partially in fluid communication with an anode 912 of a first cell 910. The first cell 910 comprises the anode 912, an electrolyte 914, and a cathode 916. The interconnect 930 comprises portion 932 on one side thereof, and another portion 934 on the opposite side of interconnect 930, where portion 934 is designed similar to or different from portion 932. At least a portion of portion 934 is at least partially in fluid communication with a cathode 926 of a second cell 920. Second cell 920 comprises cathode 926, anode 922, and an electrolyte 924.

In another embodiment, and referring now to FIG. 11, a cell system 1000 comprises an end cap 1020. End cap 1020 may be used adjacent to a first cell in a stack. At least a portion of end cap 1020 is at least in partially fluid communication with an anode 1012 of a cell 1010 and comprises a surface for an electrode distributor, for example similar to surface 200, 300, 400, 500, or any combination comprising at least one of these surfaces. Cell 1010 comprises the anode 1012, an electrolyte 1014, and a cathode 1016.

One benefit of the fluid distribution surface design comprises providing improved fluid distribution to an electrode as compared to interconnects and other structures not employing the instant fluid distributor. Such improved fluid distribution consequently results in increased fuel utilization. Increased fuel utilization also provides a consequential benefit of increased water production, which is particularly useful when the heat from the water is used for further processes.

The fluid distribution also enhances the structural durability of the interconnect or end structure, which consequently enhances structural durability of the entire cell stack, and reduces the amount of spent fuel directed from one inlet portion to a subsequent inlet portion. With the present electrode fluid distributor, it is believed that greater than or equal to about 50% of the spent fuel in an inlet section flows directly to the adjacent outlet section, with greater than or equal to about 75% of the spent fuel flowing to the adjacent outlet section preferred and believed possible.

Further consequential benefits of the fluid distribution, which is preferably uniform in both flow rate and concentration, include increased current density, an overall increase in cell output, decreased fuel waste, capability to produce smaller cells, optimal usage of available cell area, minimization or elimination of macro scale temperature gradients which adversely affect durability, among other benefits.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. An electrode fluid distributor comprising a fluid passageway comprising a plurality of segment pairs each comprising an inlet segment and an adjacent outlet segment with a baffle disposed therebetween, wherein said inlet segments are in fluid communication with an inlet, subsequent inlet segments, and adjacent outlet segments, and said outlet segments are in fluid communication with an outlet and subsequent outlet segments, wherein said segment pairs are defined by walls disposed between adjacent inlet segments and adjacent outlet segments and by sidewalls disposed between adjacent segment pairs, wherein the baffle has at least a baffle portion having a height less than a sidewall height, said baffle portion disposed at a baffle second end opposite a baffle first end, and wherein the baffle first end is disposed adjacent a wall first end.

2. The electrode fluid distributor as set forth in claim 1, wherein said said walls have a wall portion having a height less than said sidewall height, said wall portion disposed at the wall first end, and wherein the wall first end is disposed adjacent a sidewall first end.

3. The electrode fluid distributor as set forth in claim 2, wherein said walls further comprise a plurality of first openings disposed therethrough.

4. The electrode fluid distributor as set forth in claim 3, wherein the segment pairs have a width, which remains substantially constant along a fluid passageway length.

5. The electrode fluid distributor as set forth in claim 2, wherein said wall height varies between adjacent segment pairs.

6. The electrode fluid distributor as set forth in claim 3, wherein the segment pairs have a segment pair length, which remains substantially constant along a fluid passageway length.

7. The electrode fluid distributor as set forth in claim 1, further comprising a plurality of the fluid passageways.

8. The electrode fluid distributor as set forth in claim 1, wherein the fluid passageway is at least partially configures with a turn.

9. The electrode fluid distributor as set forth in claim 1, wherein the fluid passageway is at least partially configures with a plurality of turns.

10. The electrode fluid distributor as set forth in claim 9, wherein the plurality of turns forms a labyrinth.

11. A solid oxide fuel cell comprising;

a first electrode;

a second electrode;

an electrolyte between said first electrode and said second electrode;

a separator disposed on a side of said first electrode opposite said electrolyte; and an electrode fluid distributor disposed between said separator and said first electrode, and at least in partial physical contact with said first electrode, said electrode fluid distributor comprising a fluid passageway comprising a plurality of segment pairs each comprising an inlet segment and an adjacent outlet segment with a baffle disposed therebetween, wherein said inlet segments are in fluid communication with an inlet, subsequent inlet segments, and adjacent outlet segments, and said outlet segments are in fluid communication with an outlet and subsequent outlet segments;

wherein said segment pairs are defined by walls disposed between adjacent inlet segments and adjacent outlet segments and by sidewalls disposed between adjacent segment pairs, wherein the baffle extends from the seperator toward the first electrode and further comprises a first baffle opening disposed adjacent said first electrode.

12. The solid oxide fuel cell as set forth in claim 11, wherein said baffle compresses a plurality of second baffle openings disposed therethrough.

13. The solid oxide fuel cell as set forth in claim 11, wherein said walls extend from said first electrode toward said seperator and comprise a first wall opening disposed adjacent said seperator.

14. The solid oxide fuel cell as set forth in claim 13, wherein said walls further comprise a plurality of second wall openings disposed therethrough.

15. The solid oxide fuel cell as set forth in claim 11, wherein said electrode fluid distributor further comprises a plurality of the fluid passageways.

16. The solid oxide fuel cell as set forth in claim 11, wherein said fluid passageway comprises turn selected from the group consisting of a continuous curved bend, a non-continuous curved bend, a discreet bend and combinations comprising at least one of the foregoing turns.

17. The solid oxide fuel cell as set forth in claim 16, wherein the fluid passageway forms a spiral configuration.

* * * * *